(12) United States Patent
Wen et al.

(10) Patent No.: US 11,854,452 B2
(45) Date of Patent: Dec. 26, 2023

(54) SEAMLESS TRANSITION FOR MULTIPLE DISPLAY REFRESH RATES

(71) Applicant: Google LLC, Mountain View, CA (US)

(72) Inventors: Chien-Hui Wen, Cupertino, CA (US); Yichi Chen, Santa Clara, CA (US); Hsin-Yu Chen, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/753,039

(22) PCT Filed: Oct. 4, 2019

(86) PCT No.: PCT/US2019/054674
§ 371 (c)(1),
(2) Date: Feb. 16, 2022

(87) PCT Pub. No.: WO2021/066837
PCT Pub. Date: Apr. 8, 2021

(65) Prior Publication Data
US 2022/0343820 A1    Oct. 27, 2022

(51) Int. Cl.
*G09G 3/20* (2006.01)
*G06F 3/0484* (2022.01)

(52) U.S. Cl.
CPC ............ *G09G 3/20* (2013.01); *G06F 3/0484* (2013.01); *G09G 2320/0247* (2013.01);
(Continued)

(58) Field of Classification Search
None
See application file for complete search history.

(56) References Cited

U.S. PATENT DOCUMENTS 6,862,022 B2   3/2005  Slupe
9,501,993 B2  11/2016  Nambi
(Continued)

FOREIGN PATENT DOCUMENTS

CN         106875925    *  6/2017  ............... G09G 5/10
GB  PCT/GB2018051348  *  5/2018  ............... G09G 3/20
(Continued)

OTHER PUBLICATIONS

Written Opinion and International Search Report for corresponding PCT application No. PCT/2019/054674 dated Dec. 9, 2019.
(Continued)

*Primary Examiner* — Ifedayo B Iluyomade
(74) *Attorney, Agent, or Firm* — McDonnell Boehnen Hulbert & Berghoff LLP

(57) ABSTRACT

An example device includes a display component that is configured to operate at a first refresh rate or a second refresh rate. The device also includes one or more processors operable to perform operations. The operations include identifying a rate change triggering event while the display component is operating at the first refresh rate. The operations further include determining a current brightness value of the display component. The operations also include determining, based on an environmental state measurement associated with an environment around the device, a threshold brightness value. The operations additionally include transitioning the display component from the first refresh rate to the second refresh rate m response to identifying the rate change triggering event if the current brightness value of the display component meets or exceeds the threshold brightness value.

20 Claims, 8 Drawing Sheets

(52) U.S. Cl.
CPC . *G09G 2320/041* (2013.01); *G09G 2330/021* (2013.01); *G09G 2354/00* (2013.01); *G09G 2360/144* (2013.01); *G09G 2360/16* (2013.01)

(56) References Cited

U.S. PATENT DOCUMENTS

2014/0125618 A1    5/2014   Panther
2020/0082791 A1*   3/2020   Petrie ........................ G09G 3/20

FOREIGN PATENT DOCUMENTS

| GB | 2562536 A | 11/2018 |
|----|-----------|---------|
| WO | 2018/211287 | 11/2018 |

OTHER PUBLICATIONS

Korean Patent Office, Office dated Sep. 19, 2023, issued in connection with Korean Patent Application No. 1020227000850, 10 pages.

* cited by examiner

SEAMLESS TRANSITION FOR MULTIPLE DISPLAY REFRESH RATES

CROSS REFERENCE TO RELATED APPLICATIONS

This present application claims priority as a U.S. national stage entry of PCT application serial no. PCT/US2019/054674 filed Oct. 4, 2019, the full disclosure of which is incorporated herein by reference.

BACKGROUND

A refresh rate may refer to the number of times per second at which an image refreshes on a display of a computing device. For example, a refresh rate of 60 Hertz (Hz) means that an image is refreshed 60 times per second. Higher refresh rates typically lead to better user experiences, but also result in higher power usage for the computing device.

Sometimes, a display can operate at multiple refresh rates. For example, when executing a video streaming application, a computing device may set the refresh rate of a display component to 90 Hz, whereas when executing a word processing application, the computing device may set the refresh rate of the display component to 60 Hz.

SUMMARY

The present disclosure generally relates to a display component of a computing device. The display component may be configured to operate at multiple refresh rates. Depending on one or more environmental state measurements, a controller of the computing device may transition the display component from a first refresh rate to a second refresh rate.

In a first aspect, a device is provided. The device includes a display component. The display component is configured to operate at a first refresh rate or a second refresh rate. The device also includes one or more processors operable to perform operations. The operations include identifying a rate change triggering event while the display component is operating at the first refresh rate. The operations also include determining a current brightness value of the display component. The operations further include determining, based on an environmental state measurement associated with an environment around the device, a threshold brightness value. The operations additionally include transitioning the display component from the first refresh rate to the second refresh rate in response to identifying the rate change triggering event if the current brightness value of the display component meets or exceeds the threshold brightness value.

In a second aspect, a computer-implemented method is provided. The method includes identifying, by a computing device, a rate change triggering event while a display component of the computing device is operating at a first refresh rate. The display component is configured to operate at the first refresh rate or a second refresh rate. The method also includes determining, by the computing device, a current brightness value of the display component. The method further includes determining, by the computing device and based on an environmental state measurement associated with an environment around the computing device, a threshold brightness value. The method additionally includes transitioning, by the computing device, the display component from the first refresh rate to the second refresh rate in response to identifying the rate change triggering event if the current brightness value meets or exceeds the threshold brightness value.

In a third aspect, an article of manufacture is provided. The article of manufacture may include a non-transitory computer-readable medium having stored thereon program instructions that, upon execution by one or more processors of a computing device, cause the computing device to carry out operations. The operations may include identifying a rate change triggering event while a display component of the computing device is operating at a first refresh rate, where the display component is configured to operate at the first refresh rate or a second refresh rate. The operations further include determining a current brightness value of the display component. The operations also include determining, based on an environmental state measurement associated with an environment around the computing device, a threshold brightness value. The operations additionally include transitioning the display component from the first refresh rate to the second refresh rate in response to identifying the rate change triggering event if the current brightness value meets or exceeds the threshold brightness value.

Other aspects, embodiments, and implementations will become apparent to those of ordinary skill in the art by reading the following detailed description, with reference where appropriate to the accompanying drawings.

DETAILED DESCRIPTION

Figure 1:
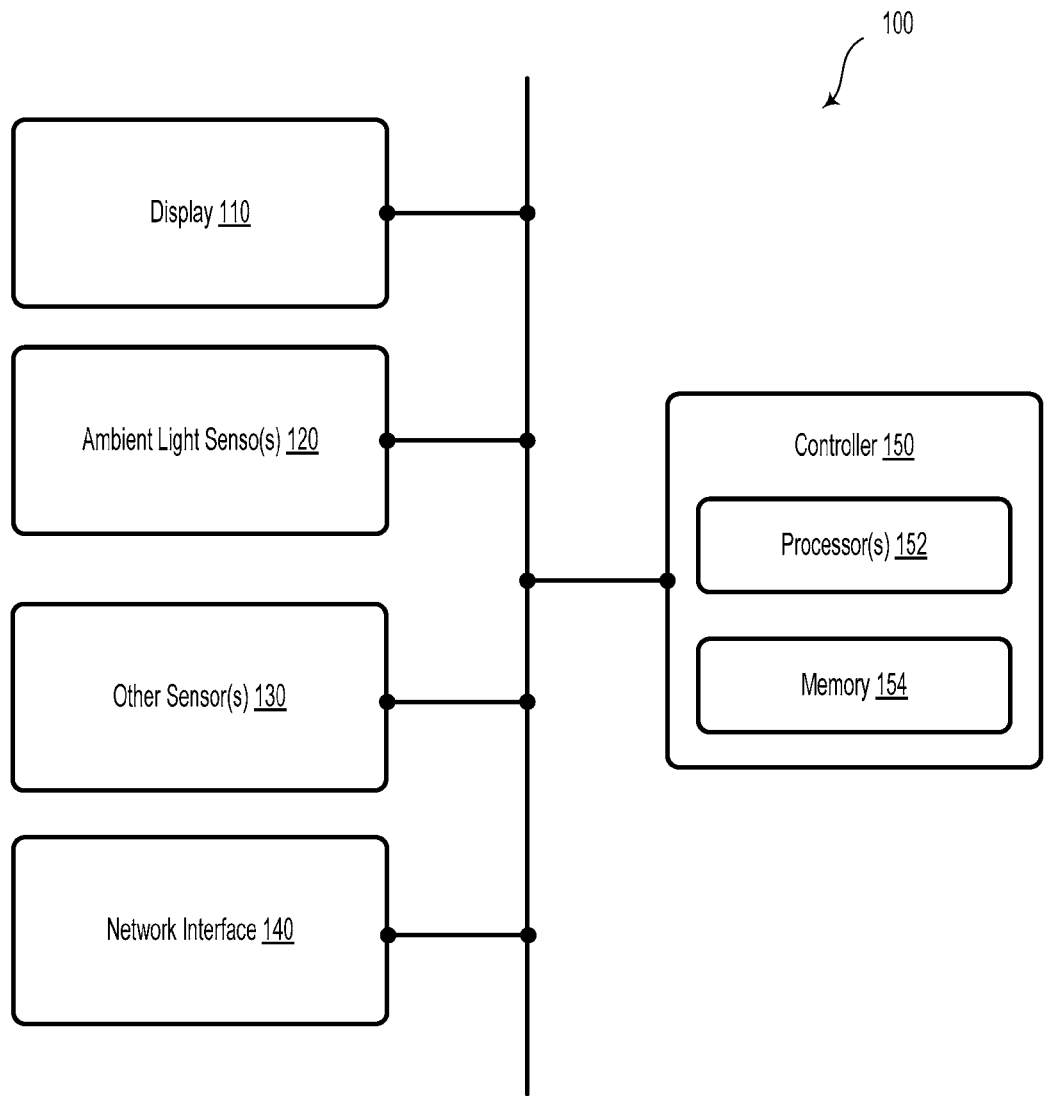
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

High display refresh rates (e.g., 90 Hz or 120 Hz) for a display component of a computing device may be desirable when executing visually complex software applications, such as video or gaming applications. However, higher refresh rates also cause the computing device to consume more power. To strike a balance between performance and battery life, some display components can operate at one of multiple different refresh rates (e.g., 60 Hz and 90 Hz). That is, depending on the application being executed, the display component can switch between a 60 Hz and a 90 Hz refresh rate.

However, optical characteristics may differ between 60 Hz and 90 Hz refresh rates. Specifically, the luminance and color of the display component may differ between 60 Hz and 90 Hz. When the display component switches from 60 Hz to 90 Hz (and vice versa), this optical difference may manifest itself as visual flicker on the display component. Consequently, if the display component frequently switches between 60 Hz and 90 Hz refresh rates, the visual flicker may become highly pronounced and detrimental to a user's experience. Further, because human eyes are highly sensitive to luminance and/or color changes at low brightness settings, the visual flicker is especially noticeable when the brightness of the display component is low and/or when the ambient light of the environment surrounding the display component is low.

Some solutions attempt to solve this "flicker problem" by disabling transitions between 60 Hz and 90 Hz when the brightness of the display component is low. But an issue with these solutions is that the definition of what is considered "low display brightness" can be fairly high. In some example devices, the ideal brightness transition threshold to alleviate all flickering has been found to be 75%. In other words, if the brightness of the display component is at or above 75% of the total possible brightness of the display component, then transitions between 60 Hz and 90 Hz may be permitted. And if the brightness of the display component is below 75% of the total possible brightness, then transitions between 60 Hz and 90 Hz may not be permitted. But because users often keep the brightness of the display component below 75%, minimum benefits of using multiple refresh rates are obtained.

Some techniques described herein address these issues by dynamically adjusting the brightness transition threshold based on a current ambient light measurement. Specifically, a computing device may disable transitions between 60 Hz and 90 Hz when the ambient light measurement is low, and then may gradually lower the brightness transition threshold as the ambient light measurement increases. For example, at 1 lux, the brightness transition threshold may be set to 75% of the total possible brightness of the display component. At 90 lux, the brightness transition threshold may be set to 67% of the total possible brightness of the display component, and so on. Moreover, other environmental measurements, such as ambient temperature, may also be utilized to dynamically adjust the brightness transition threshold as well or instead.

Additionally, some embodiments described herein may dynamically adjust the time in which the display component remains at 90 Hz after a last display event (e.g., a last interaction of a user with a graphical user interface, e.g. a touch on the display component or a gesture detected by radar, or a last application update). In other words, after transitioning from 60 Hz to 90 Hz, the methods described herein can dynamically adjust the time that the display component waits before transitioning back to 60 Hz from 90 Hz. By dynamically adjusting this waiting time, high amounts of "flip-flopping" between the 60 Hz and the 90 Hz refresh rate can be prevented, which has a positive effect on user experience.

By using the herein-described techniques, multiple refresh rates can be utilized while reducing or eliminating any flicking effect. Other advantages are also contemplated and will be appreciated from the discussion herein.

II. Example Devices

FIG. 1 illustrates computing device 100, in accordance with example embodiments. Computing device 100 includes display component 110, one or more ambient light sensors 120, one or more other sensors 130, network interface 140, and controller 150. In some examples, computing device 100 may take the form of a desktop computing device, a server device, or a mobile computing device. Computing device 100 may be configured to interact with an environment. For example, computing device 100 may obtain environmental state measurements associated with an environment around computing device 100 (e.g., temperature measurements, ambient light measurements, etc.).

Display component 110 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display component 110 may also be configured to generate audible outputs, such as with a speaker, speaker jack, audio output port, audio output device, earphones, and/or other similar devices. Display component 110 may further be configured with one or more haptic components that can generate haptic outputs, such as vibrations and/or other outputs detectable by touch and/or physical contact with computing device 100.

In example embodiments, display component 110 is configured to provide output signals at a given refresh rate. The refresh rate may correspond to the number of times display component 110 updates with new content each second. For example, a 60 Hz refresh rate may mean that display component 110 updates 60 times per second. In example embodiments, display component 110 may operate at a 60 Hz, a 90 Hz, or a 120 Hz refresh rate, among other possibilities.

Ambient light sensor(s) 120 may be configured to receive light from an environment of (e.g., within 1 meter (m), 5 m, or 10 m of) computing device 100. Ambient light sensor(s) 120 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 120 may include indium gallium arsenide (InGaAs) APDs configured to detect light at wavelengths around 1550 nanometers (nm). Other types of ambient light sensor(s) 120 are possible and contemplated herein.

In some embodiments, ambient light sensor(s) 120 may include a plurality of photodetector elements disposed in a one-dimensional array or a two-dimensional array. For example, ambient light sensor(s) 120 may include sixteen detector elements arranged in a single column (e.g., a linear array). The detector elements could be arranged along, or could be at least parallel to, a primary axis.

In some embodiments, computing device 100 can include one or more other sensors 130. Other sensor(s) 130 can be configured to measure conditions within computing device 100 and/or conditions in an environment of (e.g., within 1 m, 5 m, or 10 m of) computing device 100 and provide data about these conditions. For example, other sensor(s) 130 can include one or more of: (i) sensors for obtaining data about computing device 100, such as, but not limited to, a thermometer for measuring a temperature of computing device 100, a battery sensor for measuring power of one or more batteries of computing device 100, and/or other sensors measuring conditions of computing device 100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 100, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 130 are possible as well.

Data gathered from ambient light sensors(s) 120 and other sensor(s) 130 may be communicated to controller 150, which may use the data to perform one or more actions on display component 110, as further described herein.

Network interface 140 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 140 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 150 may include one or more processors 152 and memory 154. Processor(s) 152 can include one or more general purpose processors and/or one or more special purpose processors (e.g., digital signal processors (DSPs), tensor processing units (TPUs), graphics processing units (GPUs), application specific integrated circuits (ASICs), etc.). Processor(s) 152 may be configured to execute computer-readable instructions that are contained in memory 154 and/or other instructions as described herein. Memory 154 may include one or more non-transitory computer-readable storage media that can be read and/or accessed by processor(s) 152. The one or more non-transitory computer-readable storage media can include volatile and/or non-volatile storage components, such as optical, magnetic, organic or other memory or disc storage, which can be integrated in whole or in part with at least one of processor(s) 152. In some examples, memory 154 can be implemented using a single physical device (e.g., one optical, magnetic, organic or other memory or disc storage unit), while in other examples, memory 154 can be implemented using two or more physical devices.

In example embodiments, processor(s) 152 are configured to execute instructions stored in memory 154 so as to carry out operations.

The operations may include identifying a rate change triggering event while the display component 110 is operating at a first refresh rate. For example, display component 110 may be operating at a first 60 Hz refresh rate. In some embodiments, the rate change triggering event involves a physical interaction between a user and a graphical user interface displayed by display component 110. In some embodiments, the rate change triggering event involves information received from other sensor(s) 130 or network interface 140.

The operations may also include determining a current brightness value of the display component 110. In some embodiments, the current brightness value can be a relative value. For example, the current brightness value may be a percentage of a total possible brightness for display component 110 (e.g., 45% or 55%). In some embodiments, the current brightness value may be an absolute value. For example, the current brightness value may be a value expressed in candelas per a square meter value or nits (e.g., 60 nits or 80 nits).

The operations may further include determining, based on an environmental state measurement associated with an environment around the computing device 100, a threshold brightness value. In some embodiments, the environmental state measurement may include an ambient light measurement measured by ambient light sensor(s) 120. In some embodiments, the environmental state measurement includes measurements measured by other sensor(s) 130, for example, ambient temperatures or sound levels around computing device 100. In some embodiments, the threshold brightness value may be determined with respect to a total possible brightness for display component 110. For example, the threshold brightness value may be determined as 40% or 60% of the total possible brightness for display component 110.

The operations may also include transitioning display component 110 from the first refresh rate to the second refresh rate in response to identifying the rate change triggering event if the current brightness value of the display component meets or exceeds the threshold brightness value. For example, controller 150 may transition display component 110 from a 60 Hz refresh rate to a 90 Hz refresh rate.

Figure 2:
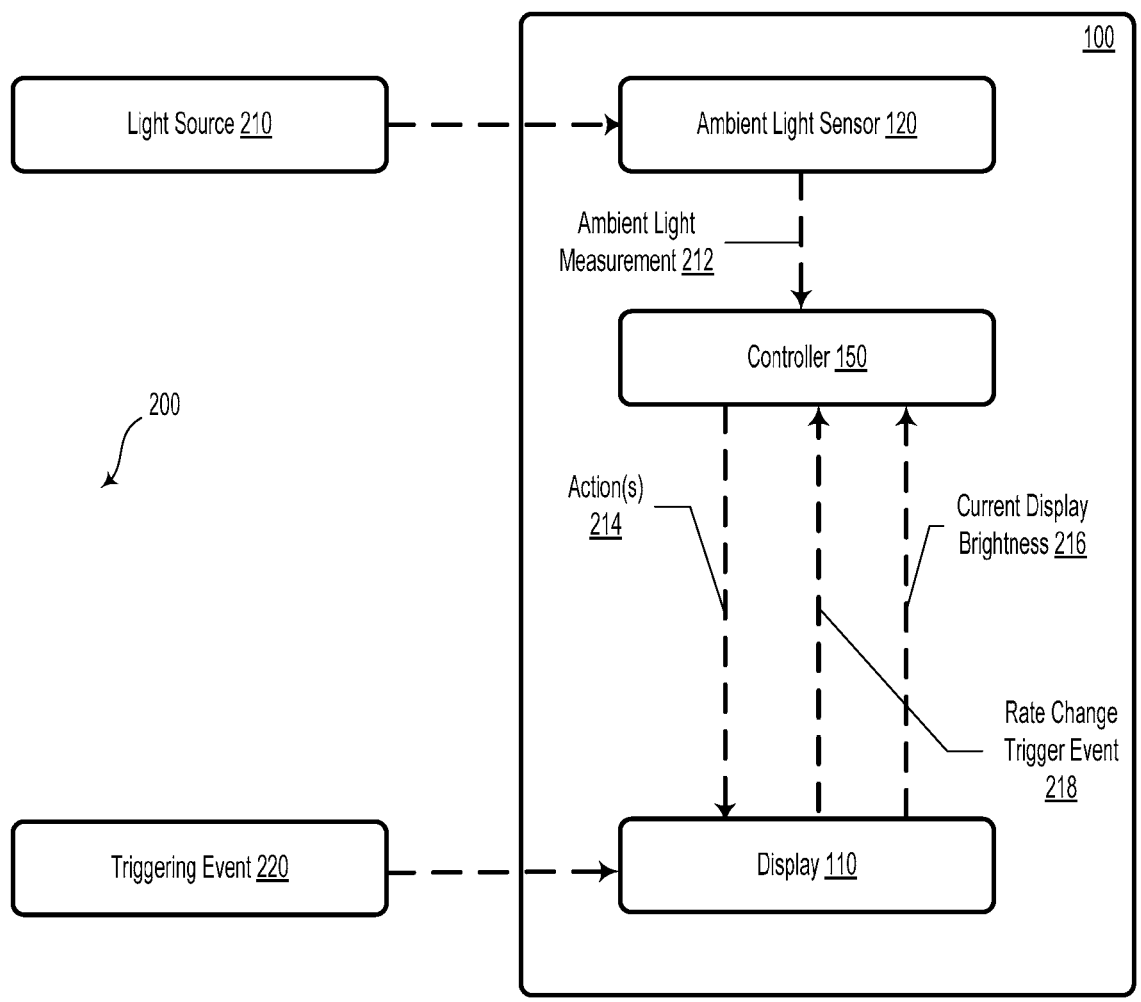
FIG. 2 illustrates a computing device and an environment, in accordance with example embodiments.

FIG. 2 illustrates a relationship between computing device 100 and environment 200, in accordance with example embodiments. Environment 200 may represent the environment surrounding computing device 100 and includes light source 210 and triggering event 220.

Light source 210 may include ambient light from the environment 200. In particular, light source 210 may include light from the sun or light reflected off of objects in environment 200, among other light sources.

Ambient light sensor(s) 120 may be optically-coupled to environment 200. That is, the arrangement of ambient light sensor(s) 120 within computing device 100 may enable ambient light sensor(s) 120 to detect light source 210 from a field of view of environment 200.

In example embodiments, ambient light sensor(s) 120 may capture the magnitude of light source 210 so as to produce ambient light measurement 212. Then, ambient light measurement 212 may be communicated by ambient light sensor(s) 120 to controller 150. Based on the value of ambient light measurement 212, controller 150 may perform one or more actions 214 on display component 110. For example, action(s) 214 may include controller 150 transitioning display component 110 from a 60 Hz refresh rate to a 90 Hz refresh rate or vice versa. In some embodiments, action(s) 214 may be based in part on current display brightness 216, which may represent a current brightness of display component 110. Current display brightness 216 may be communicated by display component 110 to controller 150.

Triggering event 220 may represent an event external to computing device 100. Triggering event 220 may act on display component 110. In some embodiments, triggering event 220 may include a user touching a touch screen interface of display component 110. Multiple triggering events may occur. For example, a first triggering event may correspond to a user making a first touch on a touch screen interface of display component 110, whereas a second triggering event may correspond to the user making a last touch on a touch screen interface of display component 110. In some embodiments, triggering event 220 may cause display component 110 to communicate rate change trigger event 218 to controller 150, which may responsively perform action(s) 214 based on rate change trigger event 218.

In some embodiments, triggering event 220 may be an event occurring internally in computing device 100. For example, triggering event 220 may be a communication received by network interface 140 and communicated to controller 150.

While FIG. 2 illustrates a particular arrangement of elements, other arrangements are possible. Additionally or alternatively, some elements of computing device 100 and environment 200 may be combined and/or rearranged.

FIGS. 3A, 3B, 3C, 3D, and 3E depict various graphs and tables that illustrate relationships between ambient light measurements, brightness transition thresholds, and idle times. Namely, the graphs and tables of FIGS. 3A, 3B, 3C, 3D, and 3E are provided as examples of graphs and tables that may be utilized by controller 150 to adjust the refresh rate of display component 110.

Figure 3A:
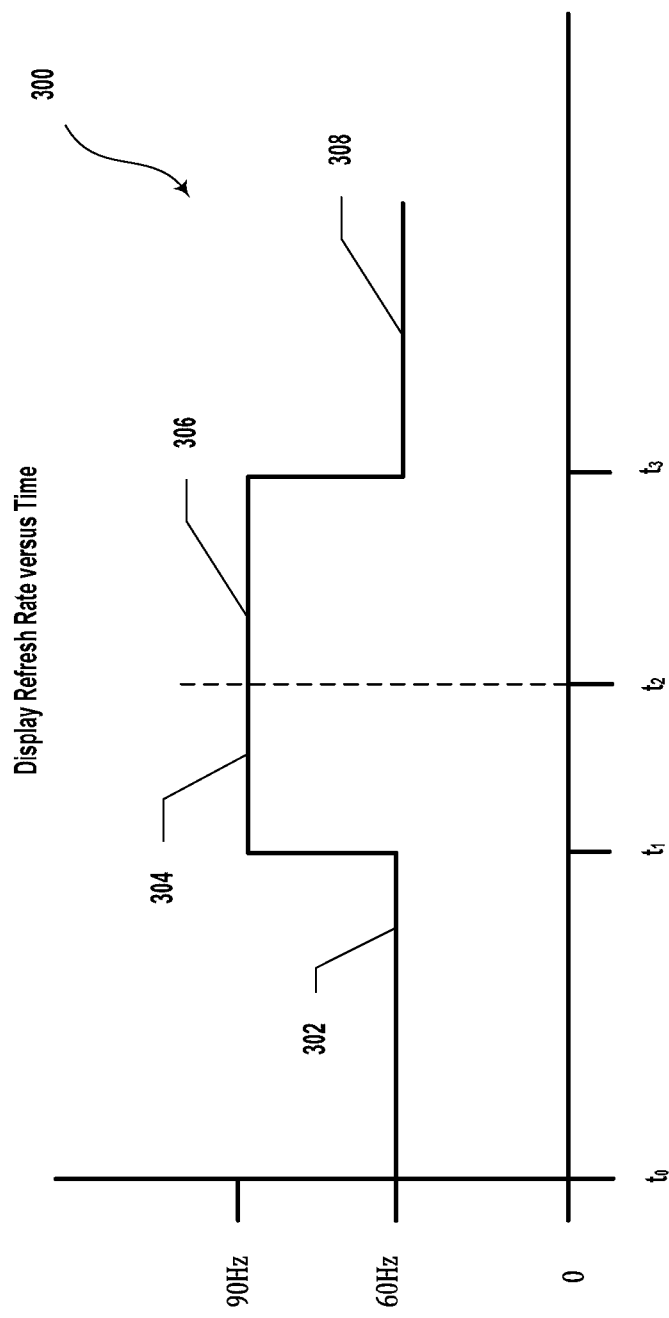
FIG. 3A depicts a graph illustrating display refresh rate versus time, in accordance with example embodiments.

FIG. 3A depicts graph 300, in accordance with example embodiments. Graph 300 illustrates the refresh rate of display component 110 over time.

During time period 302 (e.g., between time $t_0$ and $t_1$), the refresh rate of display component 110 is shown to be 60 Hz. In some embodiments, 60 Hz may correspond to a default refresh rate of the display component 110.

At $t_1$, the refresh rate of display component 110 transitions from 60 Hz to 90 Hz. This transition may be in response to a first rate change triggering event. For example, the first rate change triggering event may include a device driven event or a physical interaction with display component 110. Device driven events may include, for example, a notification received from a remote computing device (e.g., via network interface 140), a battery related event (e.g., battery level of computing device 100 being below 40%), or an application related event (e.g., computing device 100 beginning the execution of a visually complex software application, such as a video or gaming application), among other possibilities. Physical interactions may involve a first user touch on display component 110.

After the first rate change triggering event, time period 304 occurs. During time period 304 (e.g., between time $t_1$ and $t_2$), the refresh rate of display component 110 remains at 90 Hz.

At $t_2$, a second rate change triggering event occurs. For example, the second rate change triggering event may include a second device driven event or a second physical interaction with display component 110. Second device driven events may include, for example, a last notification received from a remote computing device (e.g., via network interface 140) or second application related event (e.g., computing device 100 ending the execution of a visually complex software application, such as a video or gaming application), among other possibilities. Second physical interactions may involve a last user touch on display component 110.

After the second rate change triggering event, time period 306 occurs. During time period 306 (e.g., between time $t_2$ and $t_3$), the refresh rate of display component 110 remains at 90 Hz. This time period may also be referred to herein as an "idle time" or a "threshold amount of time". After waiting the threshold period of time (e.g., time period 306) from the second rate change triggering event, display component 110 may transition back to the 60 Hz refresh rate.

During time period 308 (e.g., from time $t_3$ onward), the refresh rate of display component 110 remains at 60 Hz. Display component 110 may continue to remain at the 60 Hz refresh rate until another first rate change triggering event occurs.

While the ability to transition between 60 Hz and 90 Hz refresh rates increases the overall battery life of computing device 100, some situations may cause an undesirable user experience. In particular, if the user types slowly (e.g., a long amount of time between two inputs), display component 110 may switch back and forth between the 60 Hz and 90 Hz refresh rates. This may result in undesirable flickering to be shown on display component 110. While one solution to address this issue is to increase idle time duration, this solution may result in high power consumption, as the display component is operating at the 90 Hz refresh rate longer than necessary.

To address these issues, some examples described herein provide for the dynamic adjustment of the threshold period of time from the second rate change triggering event (e.g., time period 308). In particular, threshold period of time can be adjusted based on an environmental state measurement associated with an environment around computing device 100. For example, the threshold period of time can be adjusted based on a current ambient light measurement or a current ambient temperature measurement.

Figure 3B:
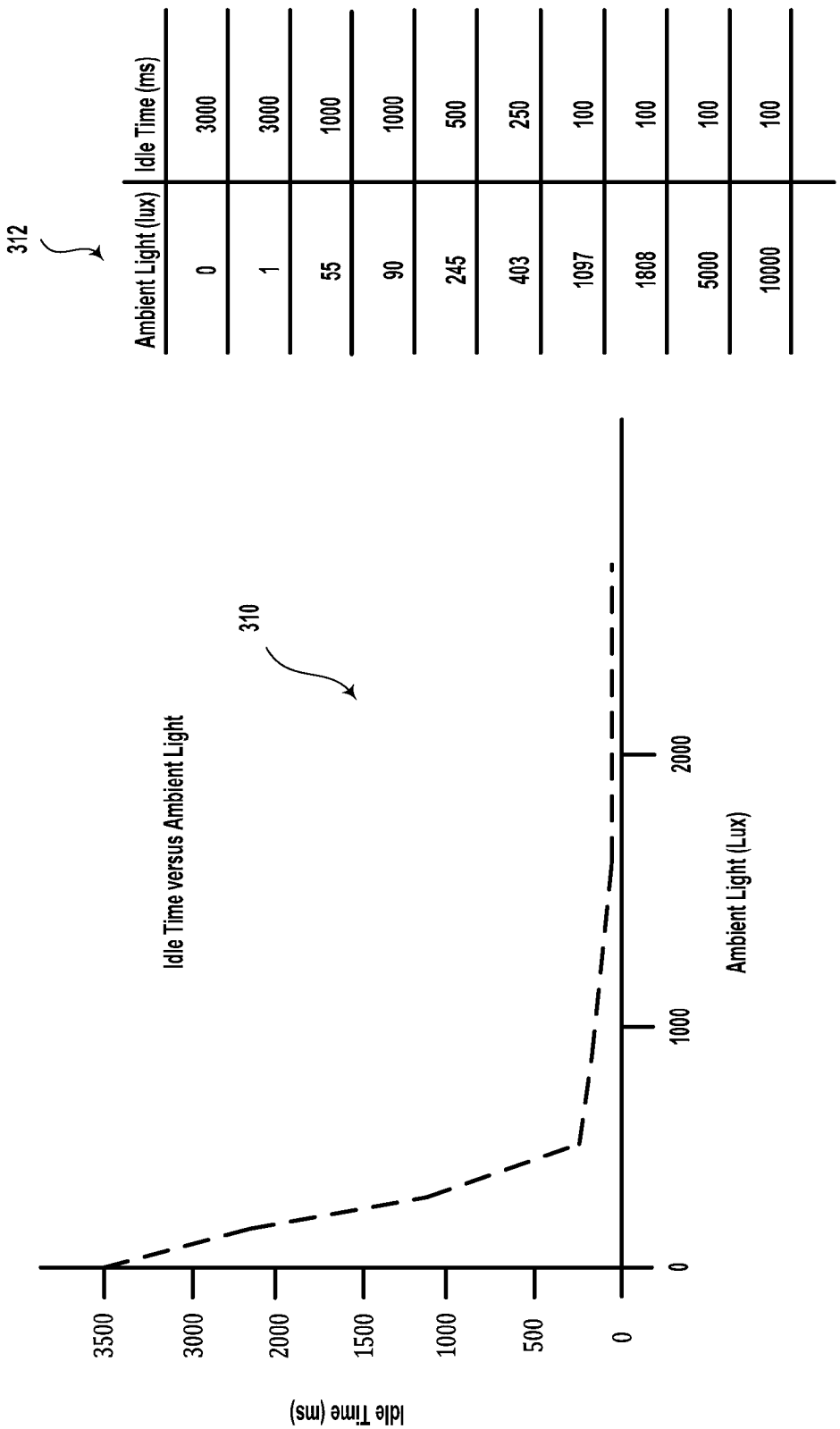
FIG. 3B depicts a graph and a table illustrating idle time versus ambient light, in accordance with example embodiments.

FIG. 3B depicts graph 310 and table 312, in accordance with example embodiments. Graph 310 and table 312 illustrate a relationship between idle time of display component 110 (e.g., the threshold period of time from the second rate change triggering event) and the amount of ambient light measured by ambient light sensor(s) 120. Namely, as the amount of ambient light measured by ambient light sensor(s) 120 increases, idle time may be decreased. Since flickering is highly pronounced at low levels of ambient light, high idle times may be used for low levels of ambient light in order to reduce the frequency of refresh rate changes at low levels of ambient light. A higher idle time reduces the impact of flickering at low levels of ambient light.

In example embodiments, controller 150 may utilize the relationship depicted in graph 310 and/or table 312 to set the idle time for display component 110. That is, controller 150 may (i) receive an ambient light measurement from ambient light sensor(s) 120, (ii) use the ambient light measurement and graph 310 and/or table 312 to determine a corresponding idle time, and (iii) set the idle time for display component 110 to the corresponding idle time. As a particular example, if the ambient light measurement is 245 lux, controller 150 may determine a corresponding idle time of 500 milliseconds (ms). Other examples of ambient light measurements and corresponding idle times are also contemplated herein.

Figure 3C:
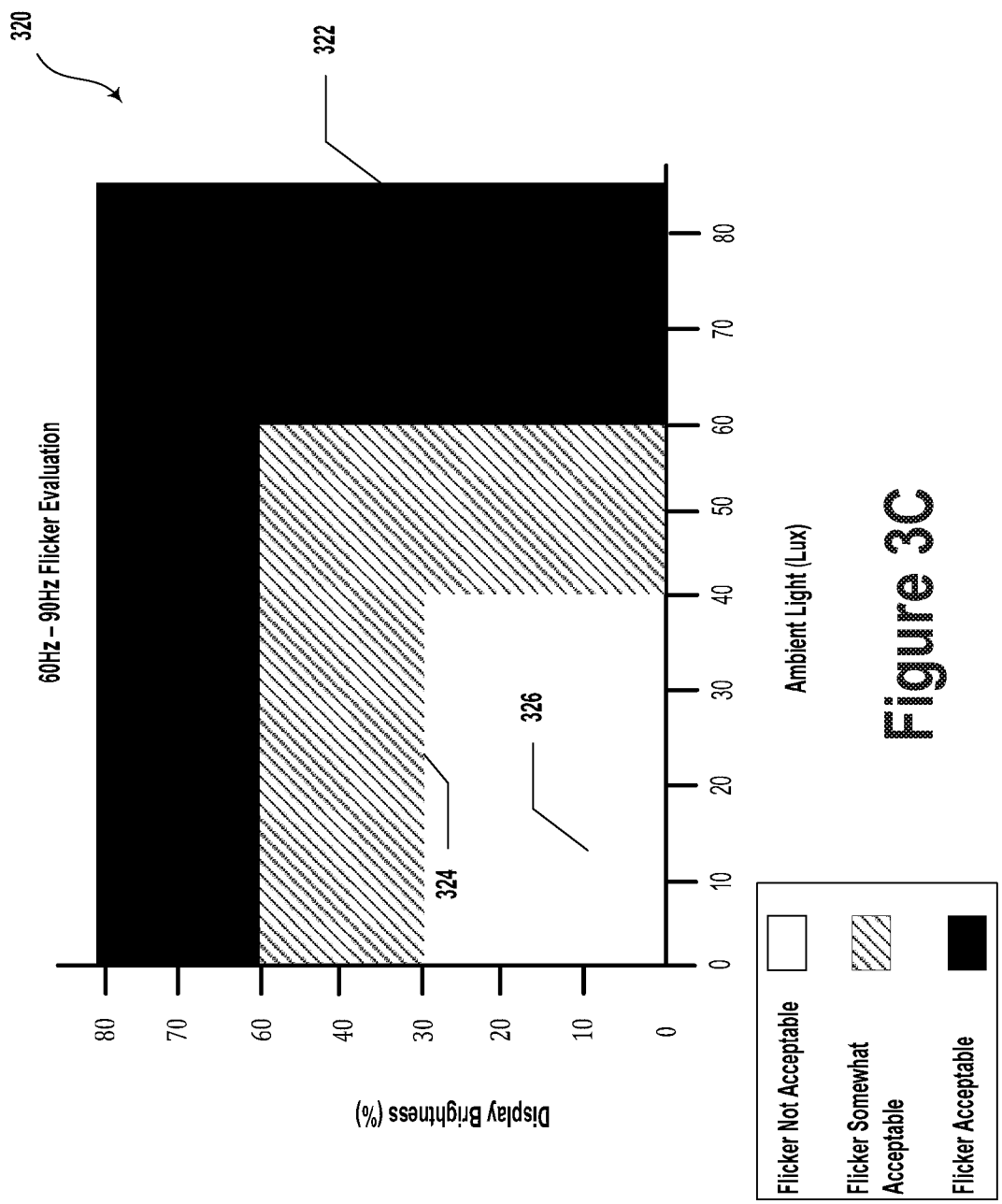
FIG. 3C depicts a graph illustrating display brightness versus ambient light, in accordance with example embodiments.

FIG. 3C depicts graph 320, in accordance with example embodiments. Graph 320 illustrates a relationship between the display brightness of display component 110 and the amount of ambient light received by ambient light sensor(s) 120. Namely, graph 320 illustrates three separate brightness zones: flicker acceptable zone 322, flicker somewhat acceptable zone 324, and flicker not acceptable zone 326. As described above, because human eyes are highly sensitive to luminance and/or color changes at low brightness settings, the visual flickering is especially noticeable when the brightness of display component 110 is low and/or when the ambient light of the environment surrounding computing device 100 is low. In particular, when ambient light is lower than 40 lux and the display brightness is lower than 30%, visual flickering becomes highly conspicuous and detrimental to the user experience. As ambient light increases to between 40 lux and 60 lux and/or the display brightness increases to between 30% and 60%, flicker becomes somewhat acceptable, as the user may only slightly notice the flickering effect. Once the ambient light increases beyond 60 lux and/or the display brightness increases beyond 60%, flicker becomes unproblematic and acceptable, as the user may not notice any flickering effect. Accordingly, the current ambient light and current display brightness of display component 110 may influence when refresh rate changes are acceptable (e.g., when flickering becomes less conspicuous). Consequently, it may be desirable to adjust when transitions between 60 Hz and 90 Hz are permitted based on the current ambient light and current display brightness of display component 110 (e.g., by using a variable brightness transition threshold dependent on ambient light).

Figure 3D:
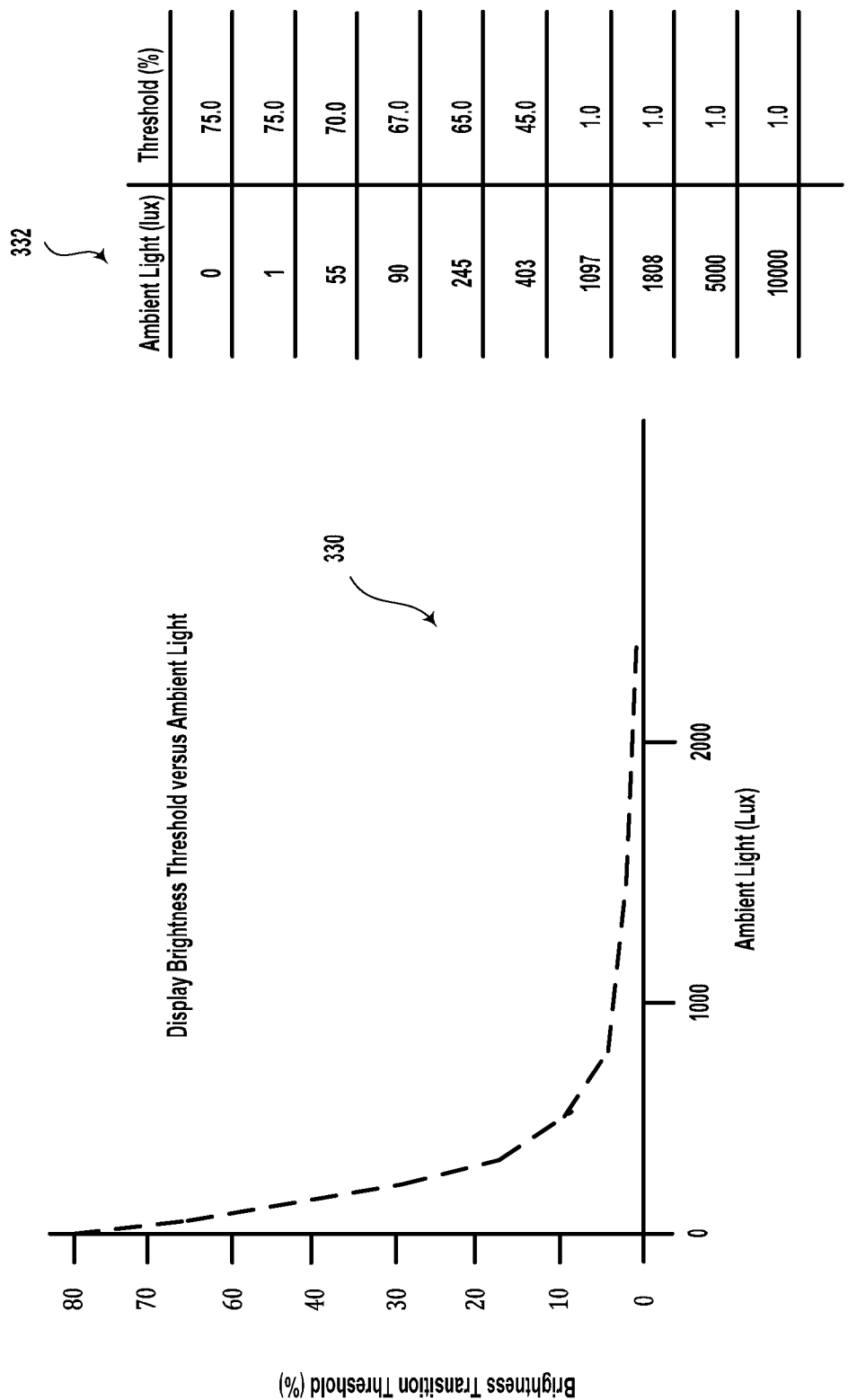
FIG. 3D depicts a graph and a table illustrating brightness transition thresholds versus ambient light, in accordance with example embodiments.

FIG. 3D depicts graph 330 and table 332, in accordance with example embodiments. Graph 330 and table 332 illustrate a relationship between the brightness transition threshold of display component 110 and the amount of ambient light received by ambient light sensor(s) 120. Namely, as the amount of ambient light measured by ambient light sensor(s) 120 increases, the brightness transition threshold may be decreased. Since flickering is less conspicuous at high levels of ambient light, more refresh rate transitions may be allowed at higher levels of ambient light. The performance of display component 110 may therefore be improved without introducing the negative effects of flickering.

In example embodiments, controller 150 may utilize the relationship depicted in graph 330 and/or table 332 to set the brightness transition threshold for display component 110. That is, controller 150 may (i) receive an ambient light measurement from ambient light sensor(s) 120, (ii) use the ambient light measurement and graph 330 and/or table 332 to determine a corresponding brightness transition threshold, and (iii) set the brightness transition threshold for display component to the corresponding brightness transition threshold. As a particular example, if the ambient light measurement is 245 lux, controller 150 may determine a corresponding brightness transition threshold of 65%. This means that if the brightness of the display component is at or above 65% of the total possible brightness of the display component, then transitions between 60 Hz and 90 Hz are permitted. And if the brightness of the display component is below 65% of the total possible brightness, then transitions between 60 Hz and 90 Hz are not permitted. Other examples of ambient light measurements and brightness transition thresholds are also contemplated herein.

Figure 3E:
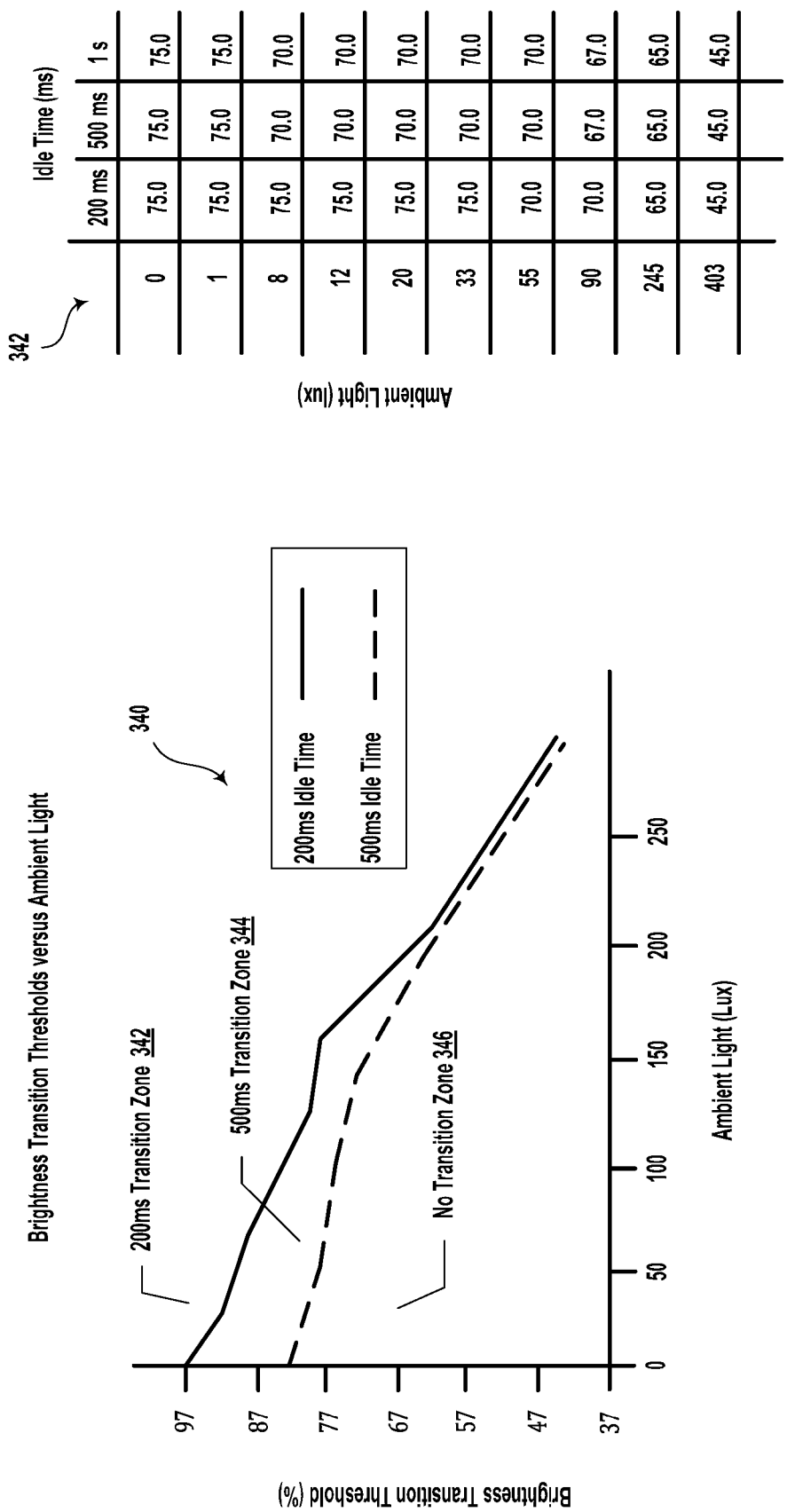
FIG. 3E depicts a graph and a table illustrating brightness transition thresholds versus ambient light for two different idle times, in accordance with example embodiments.

FIG. 3E depict graph 340 and table 342, in accordance with example embodiments. Graph 340 and table 342 illustrate a relationship between the brightness transition threshold of display component 110 and the amount of ambient light received by ambient light sensor(s) 120 for two different idle times: a 200 ms idle time and a 500 ms idle time. In particular, graph 340 and table 342 combines the concepts of graphs 310, 320, and 330 and tables 312 and 332 by using the amount of ambient light to determine: (i) what the particular brightness transition threshold should be, and (ii) what the idle time at that particular brightness transition threshold should be. For example, 200 ms transition zone 342 represents a region where transitions between 60 Hz and 90 Hz are permitted and the idle time of those transitions (e.g., the time until the display component transitions back to 60 Hz from 90 Hz after a second rate change triggering event) is 200 ms. Further, 500 ms transition zone 344 represents a region where transitions between 60 Hz and 90 Hz are also permitted and the idle time of those transitions is 500 ms. And finally, no transition zone 346 represents an area where transitions between 60 Hz and 90 Hz are not permitted. Accordingly, for a given amount of ambient light, the current brightness of display component 110 is used to select between one of three buckets: no transitions between 60 Hz and 90 Hz (e.g., no transition zone 346), some transitions between 60 Hz and 90 Hz (e.g., 500 ms transition zone 344), or relatively more transitions (because of lower idle time) between 60 Hz and 90 hz (e.g., 200 ms transition zone 342). For example, if the current amount of ambient light is 50 lux and the current brightness is 87%, then the display component may be permitted to transition between 60 Hz and 90 Hz at an idle time of 500 ms (e.g., the current amount of ambient light and current brightness may fall within 500 ms transition zone 344).

III. Example Methods

Figure 4:
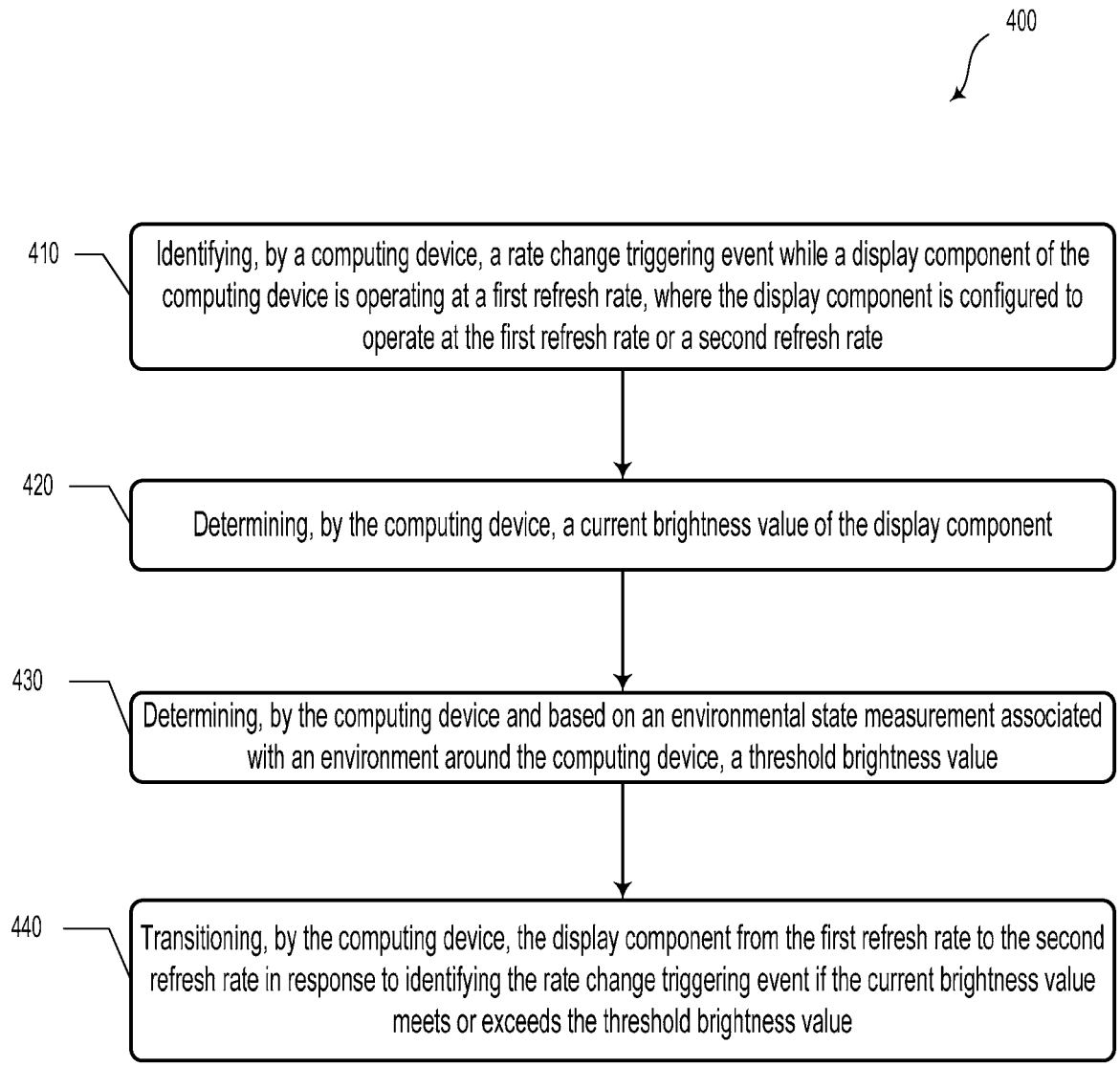
FIG. 4 illustrates a method, in accordance with example embodiments.

FIG. 4 illustrates a method 400, in accordance with example embodiments. Method 400 may include various blocks or steps. The blocks or steps may be carried out individually or in combination. The blocks or steps may be carried out in any order and/or in series or in parallel. Further, blocks or steps may be omitted or added to method 400.

The blocks of method 400 may be carried out by various elements of computing device 100 as illustrated and described in reference to FIGS. 1 and 2. Furthermore, method 400 may utilize the relationships depicted in graphs 300, 310, 320, 330, and/or 340 and/or tables 312 332, and/or 342 that are illustrated and described with regard to FIGS. 3A, 3B, 3C, 3D, and 3E.

Block 410 includes identifying, by a computing device, a rate change triggering event while a display component of the computing device is operating at a first refresh rate. The rate change triggering event may involve a device driven event on the display component (e.g., display component 110). The device driven event may include, for example, a notification received from a remote computing device (e.g., via network interface 140) or a battery level event (e.g., battery level being below 40%), among other possibilities. In some embodiments, the rate change triggering event involves a physical interaction between a user and the display component. This physical interaction may involve a first user touch on the display component.

In some embodiments, the computing device is configured to operate at the first refresh rate or a second refresh rate. For instance, the first refresh rate may be 60 Hz and the second refresh rate may be 90 Hz. Other refresh rates may also be used with the methods described herein.

Block 420 includes determining, by the computing device, a current brightness value of the display component. In some embodiments, determining the current brightness value includes receiving from the display component, by way of a wired or wireless communication link, a current brightness value. Other ways to determine the current brightness value are possible and contemplated.

Block 430 includes determining, by the computing device and based on an environmental state measurement associated with an environment around the computing device, a threshold brightness value.

In some embodiments, the environmental state measurement includes a current ambient light measurement measured by an ambient light sensor (e.g., ambient light sensor(s) 120) of the computing device. The ambient light sensor may be configured to capture a current ambient light measurement (e.g., in lux) from the environment around the computing device.

In some embodiments, the environmental state measurement includes a current ambient temperature measurement measured by an ambient temperature sensor (e.g., one of other sensor(s) 130) of the computing device. The ambient temperature sensor may be configured to capture a current ambient temperature measurement (e.g., in Celsius) from the environment around the computing device.

Block 440 includes transitioning, by the computing device, the display component from the first refresh rate to the second refresh rate in response to identifying the rate change triggering event if the current brightness value meets or exceeds the threshold brightness value.

In some embodiments, higher values for the current ambient light measurement correspond to lower values for the threshold brightness value, and lower values for the current ambient light measurement correspond to higher values for the threshold brightness value. For example, at a current ambient light measurement of 1 lux, the threshold brightness value may be 75% of the total possible brightness of the display component. At 90 lux, the threshold brightness value may be 67% of the total possible brightness of the display component. Other values may also be used.

Some embodiments include identifying a second rate change triggering event while the display component is operating at the second refresh rate. After a threshold period of time from the second rate change triggering event, these embodiments include transitioning the display component from the second refresh rate to the first refresh rate. For example, the threshold period of time may be 80 ms from the second rate change triggering event In some embodiments, the second rate change triggering event involves a physical interaction with the display component (e.g., display component 110). For example, the physical interaction may include a user performing a last touch on the display component.

In some embodiments, the threshold period of time is determined based on the environmental state measurement associated with the environment around the device. For example, the threshold period of time may be determined by a current ambient light measurement. In these embodiments, higher values for the environmental state measurement correspond to lower values for the threshold period of time and lower values for the environmental state measurement correspond to higher values for the threshold period of time. For example, at a current ambient light measurement of 1 lux, the threshold period of time may be 3000 ms. At 90 lux, the threshold period of time may be 1000 ms. Other values may also be used.

In some embodiments, if the current brightness value meets or exceeds the threshold brightness value, the display component is configured to transition from the second refresh rate to the first refresh rate after a first threshold period of time from a second rate change triggering event. In these embodiments, the operations of the one or more processors further include determining, based on the environmental state measurement, a second threshold brightness value. If the current brightness value (i) meets or exceeds the second threshold brightness value and (ii) falls below the threshold brightness value, the display component is configured to transition from the second refresh rate to the first refresh rate after a second threshold period of time from the second rate change triggering event.

In some embodiments, the first threshold period of time is less than the second threshold period of time. For example, the first threshold period of time may be 200 ms and the second threshold period of time may be 500 ms.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
   a display component, wherein the display component is configured to operate at a first refresh rate or a second refresh rate; and
   one or more processors operable to perform operations, the operations comprising:
      identifying a rate change triggering event while the display component is operating at the first refresh rate;
      determining a current brightness value of the display component;
      determining, based on an environmental state measurement associated with an environment around the device, a threshold brightness value;
      transitioning the display component from the first refresh rate to the second refresh rate in response to identifying the rate change triggering event if the current brightness value of the display component meets or exceeds the threshold brightness value;
      identifying a second rate change triggering event while the display component is operating at the second refresh rate; and
      after a threshold period of time from the second rate change triggering event, transitioning the display component from the second refresh rate to the first refresh rate.

2. The device of claim 1, further comprising an ambient light sensor configured to receive ambient light measurements from the environment around the device, wherein the environmental state measurement comprises a current ambient light measurement received by the ambient light sensor from the environment around the device.

3. The device of claim 2, wherein higher values for the current ambient light measurement correspond to lower values for the threshold brightness value, and wherein lower values for the current ambient light measurement correspond to higher values for the threshold brightness value.

4. The device of claim 2, wherein lower values for the current ambient light measurement correspond to lower values for the threshold brightness value, and wherein higher values for the current ambient light measurement correspond to higher values for the threshold brightness value.

5. The device of claim 1, wherein the rate change triggering event is initiated by a process running on the device.

6. The device of claim 1, wherein the rate change triggering event comprises a user interaction with the display component.

7. The device of claim 1, further comprising an ambient temperature sensor configured to receive ambient temperature measurements from the environment around the device, wherein the environmental state measurement comprises a current ambient temperature measurement received by the ambient temperature sensor from the environment around the device.

8. The device of claim 1, wherein the threshold period of time is 80 ms.

9. The device of claim 8, wherein the second rate change triggering event comprises a user interaction with a graphical user interface displayed by the display component.

10. The device of claim 9, wherein the user interaction of the second rate change triggering event comprises a user performing a last gesture with the graphical user interface.

11. The device of claim 8, wherein the threshold period of time is determined based on the environmental state measurement associated with the environment around the device.

12. The device of claim 11, wherein higher values for the environmental state measurement correspond to lower values for the threshold period of time, and wherein lower values for the environmental state measurement correspond to higher values for the threshold period of time.

13. The device of claim 11, wherein lower values for the environmental state measurement correspond to lower values for the threshold period of time, and wherein higher values for the environmental state measurement correspond to higher values for the threshold period of time.

14. The device of claim 1, wherein if the current brightness value meets or exceeds the threshold brightness value, the display component is configured to transition from the second refresh rate to the first refresh rate after a first threshold period of time from the second rate change triggering event, and wherein the operations further comprise:
   determining, based on the environmental state measurement, a second threshold brightness value, wherein if the current brightness value (i) meets or exceeds the second threshold brightness value and (ii) falls below the threshold brightness value, the display component is configured to transition from the second refresh rate to the first refresh rate after a second threshold period of time from the second rate change triggering event.

15. The device of claim 14, wherein the first threshold period of time is less than the second threshold period of time.

16. The device of claim 14, wherein the first threshold period of time is 200 ms.

17. The device of claim 14, wherein the second threshold period of time is 500 ms.

18. A computer-implemented method comprising:
   identifying, by a computing device, a rate change triggering event while a display component of the computing device is operating at a first refresh rate, wherein the display component is configured to operate at the first refresh rate or a second refresh rate;

determining, by the computing device, a current brightness value of the display component;

determining, by the computing device and based on an environmental state measurement associated with an environment around the computing device, a threshold brightness value, wherein the environmental state measurement comprises a current ambient light measurement received by an ambient light sensor from the environment, wherein higher values for the current ambient light measurement correspond to lower values for the threshold brightness value, and wherein lower values for the current ambient light measurement correspond to higher values for the threshold brightness value; and transitioning, by the computing device, the display component from the first refresh rate to the second refresh rate in response to identifying the rate change triggering event if the current brightness value meets or exceeds the threshold brightness value.

19. An article of manufacture including a non-transitory computer-readable medium, having stored thereon program instructions that, upon execution by one or more processors of a computing device, cause the computing device to carry out operations comprising:

identifying a rate change triggering event while a display component of the computing device is operating at a first refresh rate, wherein the display component is configured to operate at the first refresh rate or a second refresh rate;

determining a current brightness value of the display component;

determining, based on an environmental state measurement associated with an environment around the computing device, a threshold brightness value;

transitioning the display component from the first refresh rate to the second refresh rate in response to identifying the rate change triggering event if the current brightness value meets or exceeds the threshold brightness value;

identifying a second rate change triggering event while the display component is operating at the second refresh rate; and after a threshold period of time from the second rate change triggering event, transitioning the display component from the second refresh rate to the first refresh rate.

20. The device of claim 1, wherein the first rate change triggering event comprises one or more of a notification received from a remote computing device, an event associated with a battery level of the device, or an application related event.

* * * * *